Sept. 7, 1943.  F. REIMSPIESS  2,328,740

SPRINGING MECHANISM FOR VEHICLES

Filed Sept. 4, 1940

Inventor
Franz Reimspiess
By
Attorneys

Patented Sept. 7, 1943

2,328,740

UNITED STATES PATENT OFFICE 2,328,740

SPRINGING MECHANISM FOR VEHICLES

Franz Reimspiess, Stuttgart, Germany; vested in the Alien Property Custodian

Application September 4, 1940, Serial No. 355,289
In Germany September 14, 1939

2 Claims. (Cl. 180—73)

This invention relates to mechanism springing for vehicles and especially for the drive wheels of power vehicles of the type in which the wheel carrying axle or axles is or are connected to the frame by means of swingable struts which serve to transmit the spring reactions to the driving road wheel.

It is an object of the invention to improve springing mechanisms of this type and particularly by so arranging and constructing the struts that the thrust forces of the driving road wheels are so transmitted through said struts to the frame of the vehicle that the stresses resulting therefrom neutralize the stresses in said struts which result from the spring reaction.

It has been found that in constructions of this type in which the axis of the strut substantially intersects the axis of the road wheel the stresses resulting from the bending moment in the strut due to the spring reaction have added thereto the compression stress resulting from the thrust of the driving road wheel, as a result of which excessive compression stress may occur and result in buckling of the strut unless the struts are formed inordinately large.

It is an object to overcome this defect and permit the use of relatively small and light connecting struts.

Figure 1:
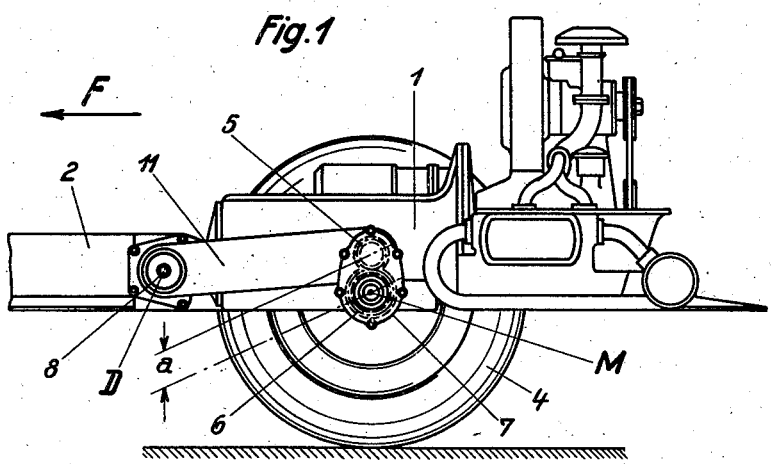
Figure 2:
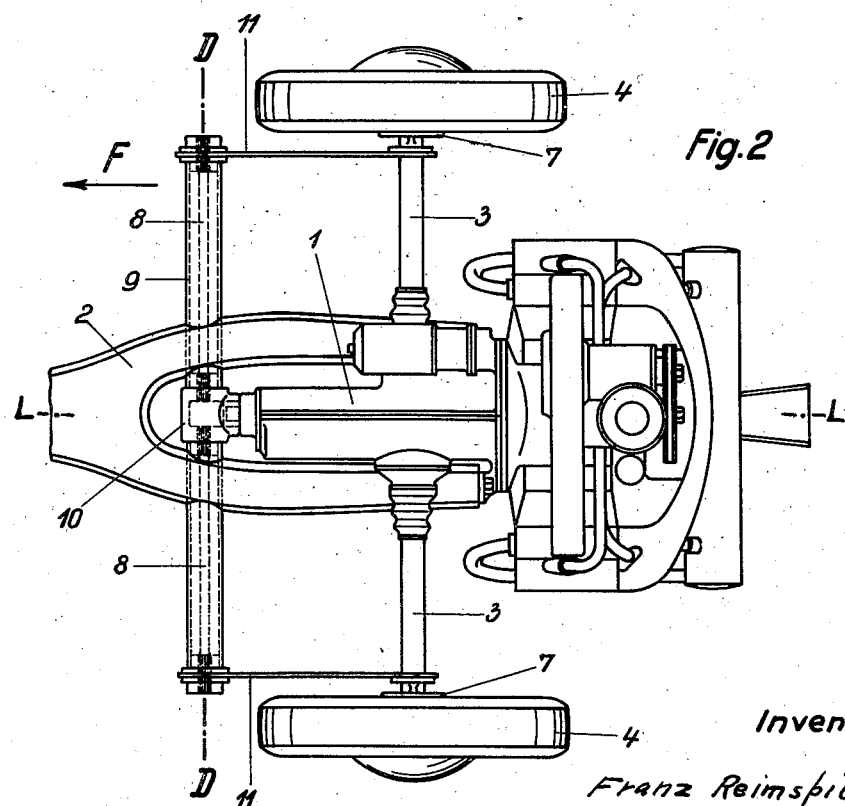

Other objects will appear from the following description of an illustrative embodiment of the invention taken together with the attached drawing wherein:

Fig. 1 shows in elevation a vehicle with a rear engine driving unit in which for clarity of illustration one of the driving wheels has been omitted, and Fig. 2 is a corresponding plan view.

In the drawing, the numeral 1 indicates the power unit of the vehicle which is mounted upon the frame 2 in any desired manner and drives the two driving wheels 4 carried by the swinging axle members 3 as by means of a pair of gear wheels 5 and 6. The arrangement is such that the driven gear wheel 6 connected with the road wheel 4 is located below the driving gear wheel 5; both gear wheels being enclosed in a housing 7 to which the swinging axle members 3 are attached, which housing also contains the necessary bearings for the gear wheels 5 and 6 and for the associated drive wheel 4.

Springing of the drive wheels 4 is effected by means of torsion bars 8 lying forwardly of the swinging axle members 3 in the direction of travel F, which torsion bars are located in a transverse tube 9 of the frame 2 and find their support in a central member 10 of the cross tube 9 lying in the longitudinal central plane L—L of the vehicle and are connected with the swinging axle members 3 by means of twistable struts 11 which are preferably arranged parallel to the longitudinal plane L—L, which struts also transmit the forward driving forces from the driving wheels 4 or the swinging axle members 3 to the transverse tube 9, and thereby to the frame 2.

For the purpose of reducing the stresses within the struts 11 these are as shown attached to the swinging axle members 3 above the center M of the drive wheels 4 and preferably at a distance $a$ which is equal to the offset of the centers of gear wheels 5 and 6, whereby the connection of the struts with the swinging axle members may take place in the simplest manner in that they may be attached directly to the swinging axle members. The common axis D of the torsion bars 8 lies higher than the centers M of the wheels so that the vehicle has a large ground clearance.

It will be noted that when no driving thrust is present, bending stresses are applied to the struts 11 due to the weight of the vehicle acting through the bars 8 upon the forward end of struts 11, which bending moment applies tension to the lower part of struts 11 and compression to the upper strut. It will also be noted that since the central axes of struts 11 pass above the center M of the road wheels the forward thrust of the road wheels will apply a bending moment to the struts 11, tending to bend the center of the struts upward, i. e., tending to introduce tension into the upper portion of the struts 11, which in part at least neutralizes the compression stress in the upper part of the struts 11, whereby these members may be dimensioned smaller with a resulting reduction in weight and cost.

It will be obvious that the same results may be obtained without utilizing the gears 5 and 6. It will also be understood that any suitable and desired springing mechanism may be used and that the struts 11 instead of being twistable may be rigid, in which case, suitable universal joints would be supplied. It is also obvious that the invention may be utilized in that form of construction in which the springs are located rearwardly of the driving axle, in which event the struts would be attached to the axles below the axes of the road wheels.

It is to be understood that the expression "frame" as used in this application is not limited to cases in which such frame is made separate or apart from the body or coachwork of the vehicle, but is to include such constructions in which a frame is formed integrally with such body or coachwork.

Having described an illustrative embodiment of the invention, it is pointed out that various changes and modifications therein may be made without departing from the invention as set forth in the following claims:

1. In a vehicle, a frame, a pair of road wheels, having driven gears concentric with the wheel axis, driving means for each road wheel including a swingable half axle pivoted on the frame and extending laterally to a position above the wheel axis, a driving gear carried by the axle and meshing with the upper portion of the driven gear, and means for resiliently mounting the wheels and supporting the vehicle body including a torsion rod fastened to the frame and arranged transversely of the vehicle, and struts secured to each axle and to the torsion rod, whereby the moments produced by the propelling forces are resisted by the torsion rod and are transmitted from the wheels to the frame through said struts.

2. The combination according to claim 1, in which said wheels are each mounted upon a swinging half axle pivoted to the frame near the central longitudinal plane of the vehicle, and said struts are relatively thin members, twistable upon up and down movement of said wheels relatively to said frame.

FRANZ REIMSPIESS.